(12) United States Patent
Jin et al.

(10) Patent No.: US 9,317,555 B2
(45) Date of Patent: Apr. 19, 2016

(54) QUERY METHOD FOR A DISTRIBUTED DATABASE SYSTEM AND QUERY APPARATUS

(71) Applicant: INTERNATIONAL BUSINESS MACHINES CORPORATION, Armonk, NY (US)

(72) Inventors: Yi Jin, Beijing (CN); Lei Li, Beijing (CN); Chun E. Ma, Beijing (CN); Li Li Ma, Beijing (CN); Bo Yang, Beijing (CN); Ying Hua Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 13/933,633

(22) Filed: Jul. 2, 2013

(65) Prior Publication Data
US 2014/0025704 A1    Jan. 23, 2014

(30) Foreign Application Priority Data
Jul. 19, 2012    (CN) .......................... 2012 1 0250407

(51) Int. Cl.
*G06F 17/30*    (2006.01)
*G06F 7/00*     (2006.01)

(52) U.S. Cl.
CPC .... *G06F 17/30477* (2013.01); *G06F 17/30463* (2013.01)

(58) Field of Classification Search
CPC ..................... G06F 17/30463; G06F 17/30283
See application file for complete search history.

(56) References Cited

U.S. PATENT DOCUMENTS

| | | | |
|---|---|---|---|
| 7,895,228 B2 | 2/2011 | Cragun et al. | |
| 2007/0050328 A1* | 3/2007 | Li et al. | 707/2 |
| 2010/0094802 A1* | 4/2010 | Luotojarvi et al. | 707/609 |

* cited by examiner

*Primary Examiner* — Sangwoo Ahn
(74) *Attorney, Agent, or Firm* — Law Office of Jim Boice

(57) ABSTRACT

A method, system, and/or computer program product queries a distributed database system. In one embodiment, the query method comprises: parsing a query request; generating an access plan for the query request, wherein the access plan specifies therein a database table related to the query request, and the database table has a plurality of copies stored in different database devices respectively; selecting, based on status information of each of the plurality of copies of the specified database table, one copy from the plurality of copies as a target database table; and executing a query operation in the target database table according to the access plan.

15 Claims, 4 Drawing Sheets

QUERY METHOD FOR A DISTRIBUTED DATABASE SYSTEM AND QUERY APPARATUS

This application is based on and claims the benefit of priority from China (CN) Patent Application 201210250407.0, filed on Jul. 19, 2012, and herein incorporated by reference in its entirety.

BACKGROUND

The present invention relates to a distributed database system, and more specifically, to a query method for a distributed database system and query apparatus.

Today, with the widespread popularity of internet applications, storage and access of massive data has become the primary problem in database system design. It is already very difficult for a single database to handle user's requirements. To satisfy the storage and access of massive data, a distributed database system is being widely used. In the distributed database system, database devices at different physical nodes may store different physical database sub-tables that logically constitute one database table, respectively. This can be achieved through data sharding technique. The data sharding technique may partition a large database into a plurality of database sub-tables through horizontal or vertical sharding, which may be stored in the database devices with different physical locations respectively.

SUMMARY

A method, system, and/or computer program product queries a distributed database system. In one embodiment, the query method comprises: parsing a query request; generating an access plan for the query request, wherein the access plan specifies therein a database table related to the query request, and the database table has a plurality of copies stored in different database devices respectively; selecting, based on status information of each of the plurality of copies of the specified database table, one copy from the plurality of copies as a target database table; and executing a query operation in the target database table according to the access plan.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
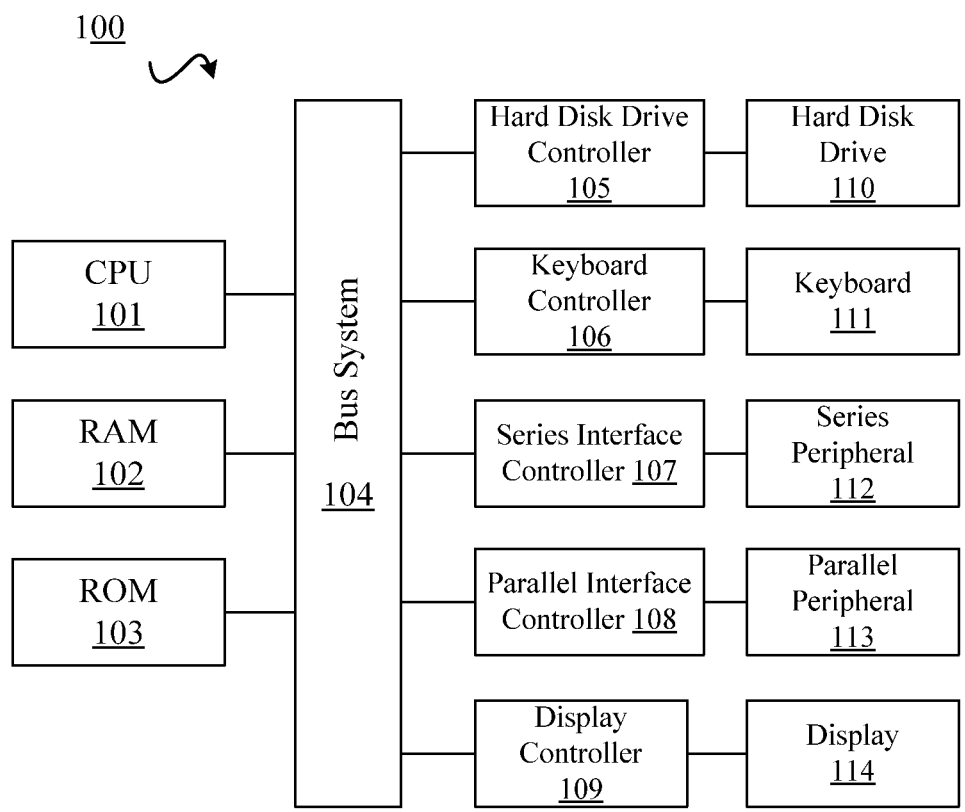
FIG. 1 shows an exemplary computer system 100 which is applicable to implement the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With a data sharding technique, load of the single database device can be effectively reduced, and thus scalability of the database system can be realized. In the distributed database system utilizing the data sharding technique, when receiving a query request from a user, the database device to which the query request is directed can be determined by parsing the query request and based on a sharding rule. Then, a query operation can be performed on the database device to obtain data and relevant results.

In addition, the database device at one physical node may also employ master/slave backup technique. By disposing a plurality of database devices at a single physical node and storing the same database table (copy) in each database device to form a master/slave backup structure, the data would be accessible even if the single database device is down.

Therefore, in the distributed database system employing the data sharding and master/slave backup, for the data query operation, there is a problem that the database table would be selected from which database device to execute the query operation.

Next, the above described problem will be further explained in a federation database system, for example. Federation database system is a type of distributed database system, which can provide a unified query interface for heterogeneous data sources located at different physical locations. These dispersed data sources may be accessed as one data source via this unified query interface. In the federation database system, each data source may store a database table obtained by performing data sharding on a logical database table and may be equipped with a plurality of database devices, and each database device may store the same database table (copy).

An existing solution to implement access to a database table copy in a data source of a federation database system is that an application layer directly assigns the database table copy in the data source, which could be implemented by means of hard-code. However, this solution requires an application developer to know the specific topology of the federation database system. Additionally, since the database table copy is assigned by hard-code, this solution has no scalability, no fault-tolerance, and no load balance.

Another existing solution to implement access to a database table copy in a data source of a federation database system is to create a view for each logical database table in the federation database system, and use hard-code to assign a database table copy. Specifically, a nickname is first created for all the database table copies of a logical database table, and one database table copy in each data source is selected to create a view for the logical database table. Thus, all operations on this logical database table can be done via the view. When executing a query operation on the federation database system, a database table copy will be assigned by hard-code. Since the assignment of the database table copy is made via hard-code, this solution has the same drawback as the first solution. In addition, since the real-time status information of the database table copy, such as workload and availability, etc., is not taken into account, the query may fail due to the assigned database table copy being unavailable or workload of the assigned database table copy being too large.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

With reference now to the figures, FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

The query method for a distributed database system according to an embodiment of the present invention will be described next with reference to FIG. 2.

In this embodiment, the distributed database system comprises database device clusters disposed at different physical locations, and each database device cluster comprises a plurality of separate database devices. A large database table may be partitioned into multiple small database tables via data sharding, and each small database table can be stored in one database device cluster. Moreover, within a single database device cluster, the corresponding database table may be stored in each database device, thereby forming the master/ slave backup of the database table. In the following description, for one database table, the same database table stored in each database device will be referred to as "a copy of database table".

Figure 2:
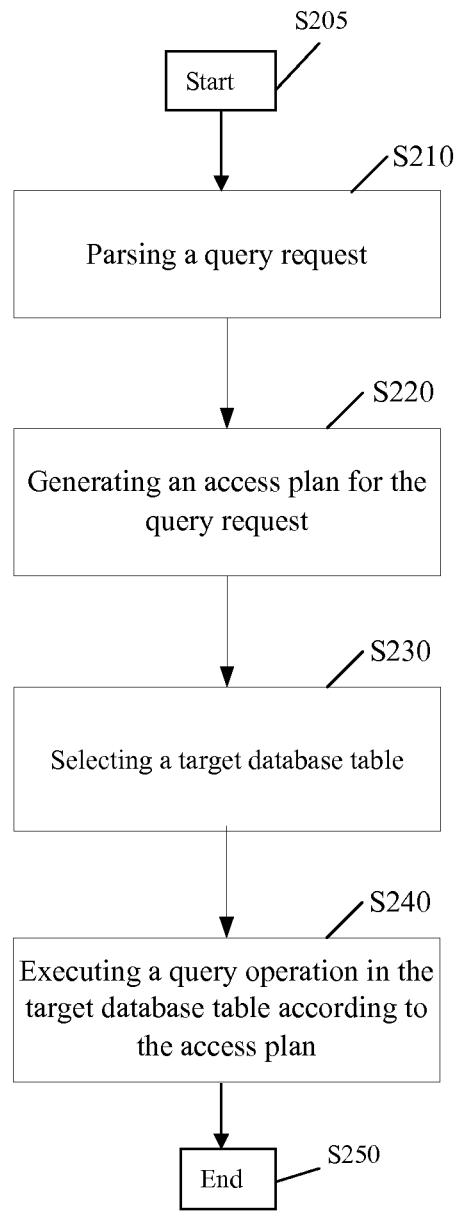
FIG. 2 is a flowchart of the query method for a distributed database system according to an embodiment of the present invention.

As shown in FIG. 2, beginning at initiator block S205, upon receipt of a query request from an application layer, the query request is parsed at step S210. Generally, the parsing of the query request comprises syntax verification, semantic verification, getting a parsing lock of an object and user permission verification. The syntax verification can be used to verify whether the syntax of the query request is correct. If there is a syntax error, the query may be stopped and an error message will be returned to the application layer. When the syntax verification is correct, a semantic verification will be conducted. The semantic verification can be used to verify whether the semantic of the query request is correct. For example, it is verified whether the database table to which the query request is directed exists. The semantic verification may be executed based on statistical information of the respective database tables stored in a catalog database. Since the copies of database table stored in each database device of the database device cluster are the same, the statistical information of these copies are also the same, and only the statistical information of one copy of the database table needs to be stored in the catalog database as the statistical information of corresponding database table. If there is a semantic error, the query may be stopped and an error message will be returned to the application layer. When the semantic is verified as correct, the parsing lock of the object will be obtained. When querying a database table, the database table needs to be locked first to guarantee unity of data. Then, the user's permission would be verified. If the user has no database access permission, the query would be stopped and an error message will be returned to the application layer.

After the parsing of the query request, at step S220, an access plan is generated for the query request. The so-called access plan refers to a scheme that how the query could be executed for a certain query request. Generally, for a query request, there may be multiple access plans. Therefore, an optimization would be executed on the access plans to determine a final access plan. Specifically, the final access plan may be generated based on the statistical information of the respective database tables in the catalog database by employing a cost based optimization mode, for example. In the final access plan, a final database table to which the query request is directed, i.e. the database table related to the query request, would be specified. Here, since the statistical information of one copy of the database table is stored in the catalog database as the statistical information of the corresponding database table, the generated access plan is of database table level.

Next, the method proceeds to the execution phase of the access plan. At step S230, based on the status information of each of the plurality of copies of the specified database table, one copy is selected from the plurality of copies as a target database table.

As stated above, when generating the access plan, only the database table related to the query request is specified, without considering the specific copy of the database table and an IP address of the database device on which the copy is stored. Therefore, during the execution phase of the access plan, firstly a copy of the final database table may be selected as a target database table. In this embodiment, the selection may take the status information of the respective copies into account.

Specifically, the status information of the copy may comprise: consistent status information which indicates whether the copy is consistent with other copies; availability status information which indicates an availability of the copy; and load status information which indicates the workload of the database device which stores the copy. A person skilled in the art can appreciate that the status information of the copy may also comprise other information which indicates the status related to the copy.

The consistent status information of a copy may be set as 'true' or '1' if the copy is consistent with other copies, and may be set as 'false' or '0' otherwise. In the case where the database table is stored in the master/slave manner, one of the copies may be regarded as a master copy and others may be regarded as salve copies. Therefore, the consistent status information may be used to indicate whether a salve copy is consistent with the master copy. Generally, data read and write operations may be performed on the master copy, while only the data read operation can be performed on the slave copies. When the data write operation is conducted, the data of the master copy is changed, so an inconsistency may occur between the salve copies and the master copy. In this case, the salve copies need to be synchronized with the master copy to ensure the data consistency.

The availability status information of a copy may be set as 'true' or '1' if the copy is available, and may be set as 'false' or '0' if the copy is unavailable. For example, if the copy is suspended or the database device which stores the copy fails, it indicates that the copy is unavailable.

The load status information may be set as a value of ratio of an actual workload to a full load of the database device. Of course, a person skilled in the art should appreciate that other form or index may also be used to represent the load status information.

In this embodiment, for each copy, the status information of the copy and the IP address of the database device which stores the copy may be recorded.

In one embodiment, firstly, based on the consistent status information of each of the plurality of copies of the specified database table, at least one copy whose consistent status information indicates that the copy is consistent with other copies (that is, the consistent status information is 'true' or '1') can be selected to form a first candidate copy set. Next, based on the availability status information of each copy in the first candidate copy set, at least one copy whose availability status information indicates that the copy is available (that is, the availability status information is 'true' or '1') can be selected from the first candidate copy set to form a second candidate copy set. Then, based on the load status information of each copy in the second candidate copy set, the copy whose load status information indicates that the database device which stores the copy has the lowest workload can be selected from the second candidate copy set as the target database table. Although it is described here that the candidate copies can be selected in the order of the consistent status information and the availability status information, those skilled in the art should appreciate that the candidate copies may be selected in the order of the availability status information and the consistent status information.

Optionally, a consistent requirement of the query request may be checked first. The consistent requirement may be explicitly specified by a user in the query request, or may be determined based on a predetermined rule. In the latter case, for example, if the query request involves the data with high realtime requirement, such as the detailed list of transactions of a bank account, the query request may be considered as having a strong consistent requirement. Then when the consistent requirement of the query request is checked as strong consistent, based on the consistent status information of each of the plurality of copies, at least one copy whose consistent status information indicates that the copy is consistent with other copies (that is, the consistent status information is 'true' or '1') can be selected to form the first candidate copy set. When the consistent requirement of the query request is checked as weak consistent, the plurality of copies may be directly selected to form the first candidate copy set without considering the consistent status information of the respective copies. Then based on the availability status information of each copy in the first candidate copy set, at least one copy whose availability status information indicates that the copy is available (that is, the availability status information is 'true' or '1') can be selected from the first candidate copy set to form the second candidate copy set. Finally, based on the load status information of each copy in the second candidate copy set, the copy whose load status information indicates that the database device which stores the copy has the lowest workload can be selected from the second candidate copy set as the target database table.

After selecting the target database table, the IP address of the database device which stores the target database table may be obtained and may be set into the access plan. Then, at step S240, the query operation is executed in the target database table according to the access plan, so as to obtain the relevant data or execution result. The result of the query operation can be returned to application layer. The process ends at terminator block S250.

It can be seen from the above description that the query method of the present embodiment is capable of improving the scalability, availability and load balance of the distributed database system by not specifying the specific copy of the database table and the IP address of the database device which stores the copy when generating the access plan, and selecting the target database table based on the status information of each copy of the specified database table when executing the access plan.

In another embodiment, in the execution phase of the access plan for the query request, the execution of the query operation may be monitored. If it is monitored that the query operation fails, for example, due to the target database table being unreachable when executing the access plan, another copy may be selected from the plurality of copies of the specified database table as the target database table based on the status information of the copies. Then, the query operation can be executed in the newly selected target database table according to the access plan.

In addition, the status information of each copy of each database table in the distributed database system may also be updated. In the distributed database system, a status table may be built to record the status information of each copy of each database table and the IP address of the database device which stores the copy.

Optionally, the status information may be updated by means of a request-response mechanism. Specifically, the status information of each copy of each database table may be requested to the database device which stores the copy, and then the database device may obtain the latest status information of the copy in response to the received request, and send the obtained latest status information. After receiving the latest status information, the current status information of the copy may be updated with the received latest status information of the copy. Optionally, the status information may be updated periodically.

Optionally, the status information may be updated via the pushing made by the database device. Specifically, when the database device detects the change of the status information the copy of database table it stores, it will push the changed status information as the latest status information. After receiving the pushed latest status information of the copy, the current status information of the copy may be updated with the received latest status information of the copy. Optionally, the database device may push the latest status information periodically.

Figure 3:
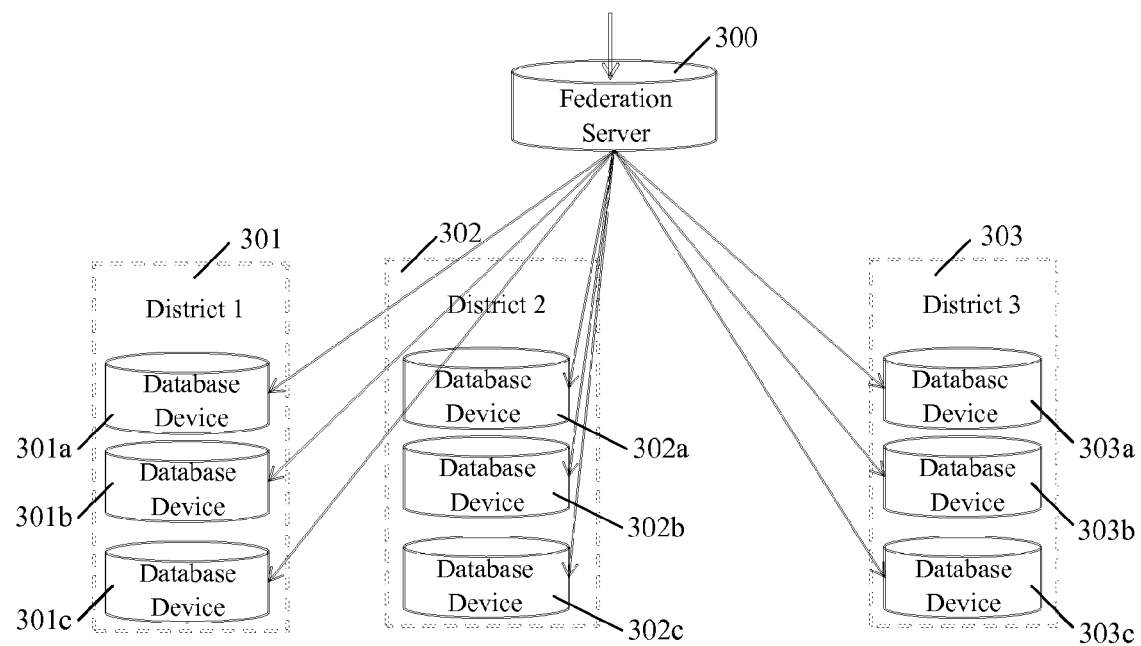
FIG. 3 is a diagram of an exemplary federation database system in which the query method according to the embodiment of the present invention can be implemented.

FIG. 3 is a diagram of an exemplary federation database system in which the query method according to the embodiment of the present invention can be implemented. In this example, the federation database system can store the data about vehicle information of a city. As shown in FIG. 3, the federation database system comprises a federation server 300 and three database device clusters 301, 302, 303 located at different physical nodes. The database device clusters 301, 302, 303 each comprises three database devices 301a, 301b, 301c, 302a, 302b, 302c, 303a, 303b, 303c, respectively. The database table about the vehicle information of the city can be split into three database tables by data sharding according to districts of the city: database table of district 1, database table of district 2, database table of district 3. The three database tables can be stored in the database device clusters 301, 302, 303 respectively. In addition, each database device 301a, 301b, 301c of the database device cluster 301 can store a copy of the database table of district 1. It is assumed that the copy of the database table of district 1 stored in the database device 301a is a master copy and the other two copies are slave copies. Similarly, each database device 302a, 302b, 302c, 303a, 303b, 303c of the database device clusters 302, 303 can accordingly store a copy of the database table of district 2 and a copy of the database table of district 3 respectively. It is assumed that the copy of the database table of district 2 stored in the database device 302a is a master copy, and the copy of the database table of district 3 stored in the database device 303a is a master copy.

The query method according to the embodiments of the present invention may be performed in the federation server 300. The federation server 300 may also store the status table as described above, which can record the status information of each copy of the database table of district 1, database table of district 2 and database table of district 3 and the IP addresses of the database devices 301a, 301b, 301c, 302a, 302b, 302c, 303a, 303b, 303c which stores the copies. In addition, a view of the database tables about the vehicle information of the city may be created in the federation server 300, and the view can comprise identification information of the database table of district 1, database table of district 2 and database table of district 3, such as the nicknames. Through the view, the database tables of the districts in the database device clusters located at the remote physical nodes can be stored as if they are in local.

Upon receipt of the query request, the federation server 300 can parse the query request and generate the access plan. For example, the query request may comprise the vehicles in the district 1, and then the generated access plan may specify the database table of district 1, but does not specify the copy in the database device. Then in the execution phase of the access plan, the appropriate copy may be selected as the target database table based on the status information of each copy of the database table of district 1, such as the copy in the database device 301b, and the IP address of the database device 301b can be set into the access plan. Finally, the query operation can be executed on the copy in the database device 301b according to the access plan.

Figure 4:
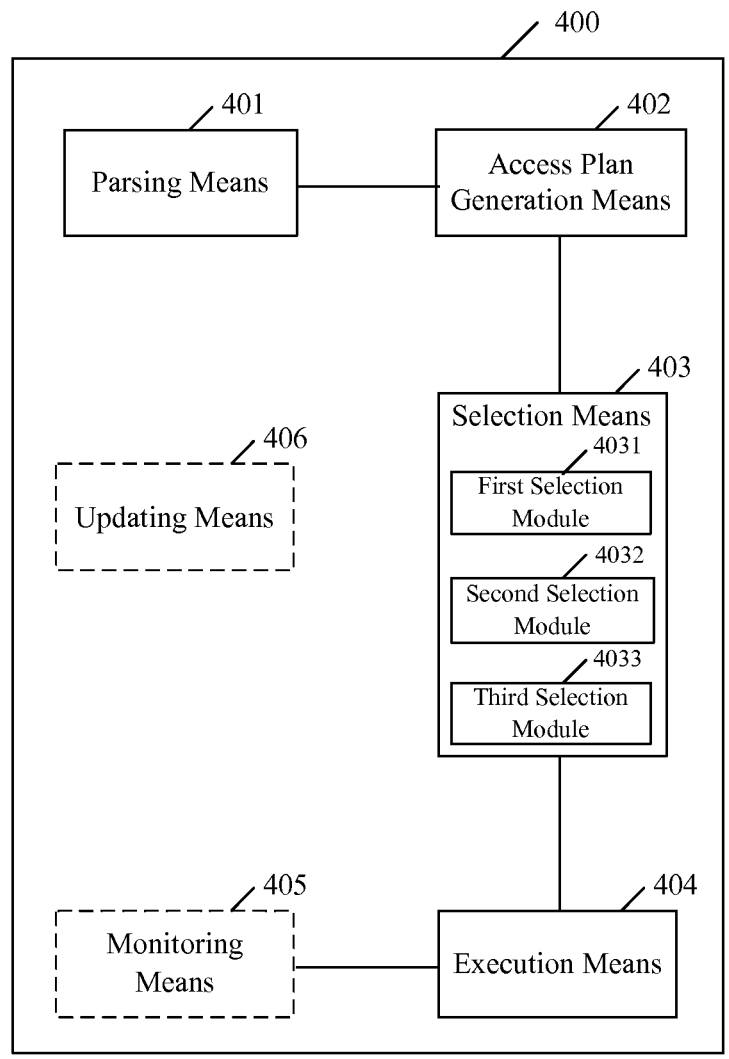
FIG. 4 is an illustrative block diagram of the query apparatus for a distributed database system according to an embodiment of the present invention.

Under the same inventive concept, FIG. 4 is an illustrative block diagram of the query apparatus 400 for a distributed database system according to an embodiment of the present invention. The embodiment will be described below in conjunction with the drawing. For the parts as same as those in the foregoing embodiments, the related description will be properly omitted.

As stated above, the distributed database system may comprise database device clusters disposed at different physical locations, and each database device cluster may comprise a plurality of separate database devices. The same database table may be stored in each database device within the database device cluster, wherein the database table may be the database table obtained after the data sharding. In the following description, for one database table, the same database table stored in each database device may be referred to as "a copy of database table".

As shown in FIG. 4, the query apparatus 400 of the present embodiment can comprise parsing means 401, access plan generation means 402, selection means 403 and execution means 404.

When receiving the query request, the parsing means 401 can parse the request. As stated above, the parsing of the query request may comprise syntax verification, semantic verification, getting a parse lock of an object and user permission verification. Then the access plan generation means 402 may generate an access plan for the query request, wherein the generated access plan can specify a database table related to the query request, but does not specify which copy of the database table.

Next the selection means 403 may select, based on the status information of each of the plurality of copies of the specified database table, one copy from the plurality of copies as the target database table. In this embodiment, the status information of a copy may comprise: consistent status information indicating whether the copy is consistent with other copies; availability status information indicating the availability of the copy; and load status information indicating workload of the database device which stores the copy.

Specifically, in the selection means 403, first selection module 4031 can select, based on the consistent status information of each of the plurality of copies of the specified database table, at least one copy whose consistent status information indicates that the copy is consistent with other copies to form the first candidate copy set. Then second selection module 4032 can select, based on the availability status information of each copy in the first candidate copy set, from the first candidate copy set at least one copy whose availability status information indicates that the copy is available to form the second candidate copy set. Finally, third selection module 4033 can select, based on the load status information of each copy in the second candidate copy set, from the second candidate copy set the copy whose load status information indicates that the database device which stores the copy has the lowest workload as the target database table. Those skilled in the art would appreciate that the first selection module 4031 and the second selection module 4032 may exchange the status information used, that is, the first selecting module 4031 may use the availability status information, and the second selecting module 4032 may use the consistent status information.

Alternately, in the selection means 403, checking module may check the consistent requirement of the query request. When the checking module checks that the consistent requirement of the query request is strong consistent, the first selection module may select, based on the consistent status information of each of the plurality of copies of the specified database table, at least one copy whose consistent status information indicates that the copy is consistent with other copies to form the first candidate copy set. When the checking module checks that the consistent requirement of the query request is weak consistent, the first selection module may directly select the plurality of copies to form the first candidate copy set, without considering the consistent status information of the respective copies. Then the second selection module may select, based on the availability status information of each copy in the first candidate copy set, from the first candidate copy set at least one copy whose availability status information indicates that the copy is available to form the second candidate copy set. Finally, the third selection module may select, based on the load status information of each copy in the second candidate copy set, from the second candidate copy set the copy whose load status information indicates that the database device which stores the copy has the lowest workload as the target database table.

After the selection means 403 selects the target database table, the execution means 404 can execute the query operation in the selected target database table according to the access plan, so as to get the relevant data and execution result. The result of the query operation can be returned to application layer.

In another embodiment, the query apparatus 400 may further comprise monitoring means 405 which is configured to monitor the execution of the query operation in the execution means 404. When the monitoring means 405 monitors that the query operation fails, the selection means 403 may again select another copy from the plurality of copies of the specified database table as the target database table, and the execution means 404 may execute the query operation in the selected new target database table according to the access plan.

Optionally, the query apparatus 400 may further comprise updating means 406, which can update the status information of each copy of each database table in the distributed database system Optionally, the updating means 406 may perform the updating utilizing the request-response mechanism. In the updating means 406, requesting module can request the status information of each copy of each database table from the database device which stores the copy. Then, receiving module can receive the latest status information of each copy sent by the database device in response to the received request, and updating module can update the current status information of each copy with the received latest status information of the copy.

Optionally, the updating means 406 may perform the updating by the pushing made by the database device. In the updating means 406, receiving module can receive the latest status information of each copy of each database table pushed by the database device which stores the copy, and updating module can update the current status information of each copy with the received latest status information of the copy.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for querying a distributed database system, the method comprising:
    parsing, by one or more processors, a query request;
    generating, by one or more processors, an access plan for the query request, wherein the access plan specifies therein a database table related to the query request, and wherein a copy of the database table is stored in multiple database devices;
    selecting, by one or more processors and based on status information of each copy of the database table, one copy of the database table from a plurality of copies of the database table as a target database table, wherein the status information of each of the plurality of copies of the database table comprises:
        consistent status information indicating whether a particular copy of the database table is consistent with other copies of the database table;
        availability status information indicating an availability of a particular copy of the database table; and
        load status information indicating workload of a database device in which a particular copy of the database table is stored;
    executing, by one or more processors, a query operation on the target database table according to the access plan;
    checking, by one or more processors, a consistent requirement of the query request;
    selecting, by one or more processors and based on the consistent status information of each of the plurality of copies, at least one copy of the database table whose consistent status information indicates that said at least one copy is consistent with other copies of the database table to form a first candidate copy set, wherein the first candidate copy set is selected in response to the consistent requirement of the query request being determined as having a consistency level that exceeds a first predefined level;
    selecting, by one or more processors, the plurality of copies to form a first candidate copy set without considering the consistent status information if the consistent requirement of the query request has a consistency level that is below a second predefined level;
    selecting from the first candidate copy set, by one or more processors and based on the availability status information of each copy of the database table in the first candidate copy set, at least one copy of the database table whose availability status information indicates that said at least one copy of the database table is available to form a second candidate copy set; and
    selecting from the second candidate copy set, by one or more processors and based on the load status information of each copy in the second candidate copy set, a copy of the database table, whose load status information indicates that the database device that stores the copy has a lowest workload compared to other database devices that are soring the copy of the database table, as the target database table.

2. The method of claim 1, further comprising:
    selecting, by one or more processors and based on the consistent status information of each of the plurality of copies, at least one copy of the database table whose consistent status information indicates that said at least one copy of the database table is consistent with other copies of the database table to form a first candidate copy set;
    selecting from the first candidate copy set, by one or more processors and based on the availability status information of each copy in the first candidate copy set, at least one copy of the database table whose availability status information indicates that said at least one copy of the database table is available to form a second candidate copy set; and
    selecting from the second candidate copy set, by one or more processors and based on the load status information of each copy of the database table in the second candidate copy set, a copy of the database table, whose load status information indicates that the database device that stores the copy of the database table has a lowest workload compared to other database devices that are storing a copy of the database table, as the target database table.

3. The method of claim 1, further comprising:
    monitoring, by one or more processors, the execution of the query operation;
    selecting, by one or more processors, another copy of the database table from the plurality of copies of the database table as the target database table if the query operation fails; and
    executing, by one or more processors, the query operation in the target database table according to the access plan.

4. The method of claim 1, further comprising:
    updating, by one or more processors, the status information of each copy of each database table in the distributed database system.

5. The method of claim 4, further comprising:
    requesting, by one or more processors, status information of each copy, of said each database table in the distributed database system, from the database device which stores said each copy;
    receiving, by one or more processors, a latest status information of a copy of the database table that is sent by the database device in response to the received request; and
    updating, by one or more processors, current status information of a copy of the database table with received latest status information of the copy of the database table.

6. The method of claim 4, further comprising:
    receiving, by one or more processors, the latest status information of each copy of the each database table pushed by the database device which stores the copy of the database table; and
    updating, by one or more processors, the current status information of each copy of the database table with the received latest status information of the copy of the database table.

7. The method of claim 1, wherein the distributed database system is a federation database system.

8. A computer program product for querying a distributed database system, the computer program product comprising a computer readable storage medium having program code embodied therewith, the program code readable and executable by a processor to perform a method comprising:

parsing a query request;

generating an access plan for the query request, wherein the access plan specifies therein a database table related to the query request, and wherein a copy of the database table is stored in multiple database devices;

selecting, based on status information of each copy of the database table, one copy of the database table from a plurality of copies of the database table as a target database table, wherein the status information of each of the plurality of copies comprises:

consistent status information indicating whether a particular copy of the database table is consistent with other copies of the database table;

availability status information indicating an availability of a particular copy of the database table; and load status information indicating workload of a database device in which a particular copy of the database table is stored;

executing a query operation on the target database table according to the access plan;

checking a consistent requirement of the query request;

selecting, based on the consistent status information of each of the plurality of copies, at least one copy of the database table whose consistent status information indicates that said at least one copy is consistent with other copies of the database table to form a first candidate copy set, wherein the first candidate copy set is selected in response to the consistent requirement of the query request being determined as having a consistency level that exceeds a first predefined level;

selecting the plurality of copies to form a first candidate copy set without considering the consistent status information if the consistent requirement of the query request has a consistency level that is below a second predefined level;

selectin from the first candidate co set and based on the availability status information of each copy of the database table in the first candidate copy set, at least one copy of the database table whose availability status information indicates that said at least one copy of the database table is available to form a second candidate copy set; and selecting, from the second candidate copy set and based on the load status information of each copy in the second candidate copy set, a copy of the database table, whose load status information indicates that the database device that stores the copy has a lowest workload compared to other database devices that are soring the copy of the database table, as the target database table.

9. The computer program product of claim 8, wherein the method further comprises:

selecting, based on the consistent status information of each of the plurality of copies, at least one copy of the database table whose consistent status information indicates that said at least one copy of the database table is consistent with other copies of the database table to form a first candidate copy set;

selecting from the first candidate copy set, based on the availability status information of each copy in the first candidate copy set, at least one copy of the database table whose availability status information indicates that said at least one copy of the database table is available to form a second candidate copy set; and selecting, from the second candidate copy set and based on the load status information of each copy of the database table in the second candidate copy set, a copy of the database table, whose load status information indicates that the database device that stores the copy of the database table has a lowest workload compared to other database devices that are storing a copy of the database table, as the target database table.

10. The computer program product of claim 8, wherein the method further comprises:

monitoring the execution of the query operation;

selecting another copy of the database table from the plurality of copies of the database table as the target database table if the query operation fails; and executing the query operation in the target database table according to the access plan.

11. The computer program product of claim 8, wherein the method further comprises:

updating the status information of each copy of each database table in the distributed database system.

12. The computer program product of claim 11, wherein the method further comprises:

requesting status information of each copy, of said each database table in the distributed database system, from the database device which stores said each copy;

receiving a latest status information of a copy of the database table that is sent by the database device in response to the received request; and updating current status information of a copy of the database table with received latest status information of the copy of the database table.

13. The computer program product of claim 11, wherein the method further comprises:

receiving the latest status information of each copy of the each database table pushed by the database device which stores the copy of the database table; and updating the current status information of each copy of the database table with the received latest status information of the copy of the database table.

14. The computer program product of claim 8, wherein the distributed database system is a federation database system.

15. A computer system comprising:

a processor, a computer readable memory, and a computer readable storage medium;

first program instructions to parse a query request;

second program instructions to generate an access plan for the query request, wherein the access plan specifies therein a database table related to the query request, and wherein a copy of the database table is stored in multiple database devices;

third program instructions to select, based on status information of each copy of the database table, one copy of the database table from a plurality of copies of the database table as a target database table, wherein the status information of each of the plurality of copies comprises:

consistent status information indicating whether a particular copy of the database table is consistent with other copies of the database table;

availability status information indicating an availability of a particular copy of the database table; and load status information indicating workload of a database device in which a particular copy of the database table is stored;

fourth program instructions to execute a query operation in the target database table according to the access plan;

fifth program instructions to check a consistent requirement of the query request;

sixth program instructions to select based on the consistent status information of each of the plurality of copies, at least one copy of the database table whose consistent status information indicates that said at least one copy is consistent with other copies of the database table to form a first candidate copy set, wherein the first candidate copy set is selected in response to the consistent requirement of the sue request being determined as having a consistency level that exceeds a first predefined level;

seventh program instructions to select the plurality of copies to form a first candidate copy set without considering the consistent status information if the consistent requirement of the query request has a consistency level that is below a second predefined level;

eighth program instructions to select, from the first candidate copy set and based on the availability status information of each copy of the database table in the first candidate copy set, at least one copy of the database table whose availability status information indicates that said at least one copy of the database table is available to form a second candidate copy set; and ninth program instructions to select, from the second candidate copy set and based on the load status information of each copy in the second candidate copy set, a copy of the database table, whose load status information indicates that the database device that stores the copy has a lowest workload compared to other database devices that are soring the copy of the database table, as the target database table; and wherein the first, second, third, fourth, fifth, sixth, seventh, eighth, and ninth program instructions are stored on the computer readable storage medium for execution by the processor via the computer readable memory.

* * * * *